(12) United States Patent
Jungwirth et al.

(10) Patent No.: US 8,960,963 B1
(45) Date of Patent: Feb. 24, 2015

(54) DUAL WAVELENGTH FOCUSABLE AND STEERABLE SEARCHLIGHT

(75) Inventors: Douglas R. Jungwirth, Porter Ranch, CA (US); Gregory A. Campbell, Granada Hills, CA (US); Emilio Quezada, Sylmar, CA (US)

(73) Assignee: The Boeing Company, Chicago, IL (US)

( * ) Notice: Subject to any disclaimer, the term of this patent is extended or adjusted under 35 U.S.C. 154(b) by 585 days.

(21) Appl. No.: 13/245,446

(22) Filed: Sep. 26, 2011

(51) Int. Cl.
*B60Q 1/14* (2006.01)
*F21V 17/02* (2006.01)
*F21V 9/00* (2006.01)
*F21V 7/00* (2006.01)
*B60Q 3/04* (2006.01)
*F21V 11/00* (2006.01)

(52) U.S. Cl.
USPC ........... 362/283; 362/293; 362/282; 362/284; 362/322; 362/346; 362/297; 362/510; 362/512; 362/514

(58) Field of Classification Search
CPC .. G02B 27/145; G02B 27/141; G02B 27/283; B60Q 1/2611; F21W 2101/02; F21W 2111/06; F21V 14/04; F21V 9/04; F21V 17/02
USPC ................. 362/231, 293, 294, 373, 282–284, 362/322–324, 297–301, 346, 540, 510, 470, 362/512, 514
See application file for complete search history.

(56) References Cited

U.S. PATENT DOCUMENTS

| 3,984,673 | A | * | 10/1976 | Gray | 362/293 |
| 4,520,388 | A | * | 5/1985 | Kellie | 348/136 |
| 4,816,975 | A | * | 3/1989 | Bahnemann et al. | 362/308 |
| 5,044,730 | A | * | 9/1991 | LaDuke et al. | 359/890 |
| 6,147,806 | A | * | 11/2000 | Park et al. | 359/634 |
| 6,585,399 | B2 | * | 7/2003 | Kreutzer et al. | 362/341 |
| 7,004,602 | B2 | * | 2/2006 | Waters | 362/242 |
| 7,168,810 | B2 | * | 1/2007 | Peterson et al. | 353/31 |
| 7,204,605 | B2 | * | 4/2007 | Kanayama et al. | 362/230 |
| 7,303,644 | B2 | * | 12/2007 | Kitabayashi et al. | 156/293 |
| 7,413,331 | B2 | * | 8/2008 | Hatanaka et al. | 362/601 |
| 8,052,308 | B2 | * | 11/2011 | Kamijima | 362/293 |
| 8,116,005 | B2 | * | 2/2012 | Huibers et al. | 359/618 |
| 2003/0012032 | A1 | * | 1/2003 | Kreutzer et al. | 362/542 |

* cited by examiner

*Primary Examiner* — Ismael Negron
*Assistant Examiner* — Erin Kryukova
(74) *Attorney, Agent, or Firm* — Clifford G. Cousins

(57) ABSTRACT

An illumination device includes a light source that emits an electromagnetic radiation input beam, a dichroic first mirror that reflects a first output beam and transmits a second output beam, a second mirror positioned to reflect the second output beam, and an absorber for absorbing radiation emitted by the light source. An adjustable support for the dichroic and second mirror is also provided and is adjustable between a first position where the first beam is transmitted and a second position where the second beam is transmitted, with the other beam being directed to the absorber.

20 Claims, 6 Drawing Sheets

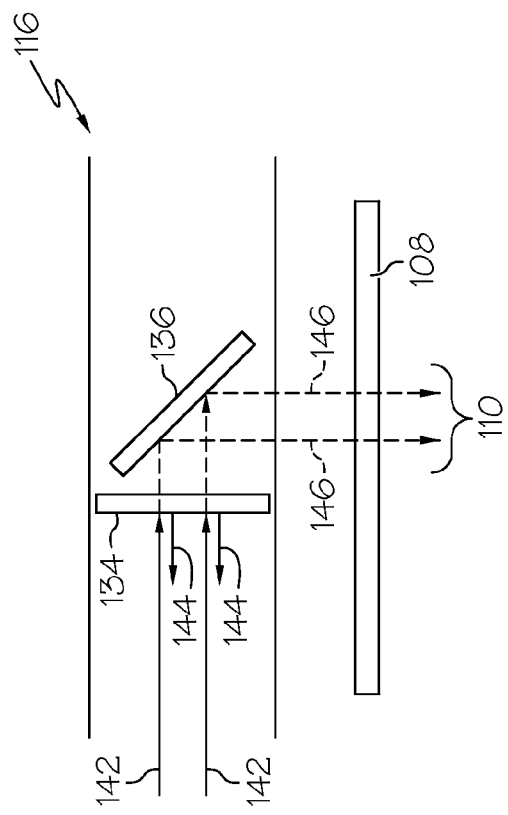
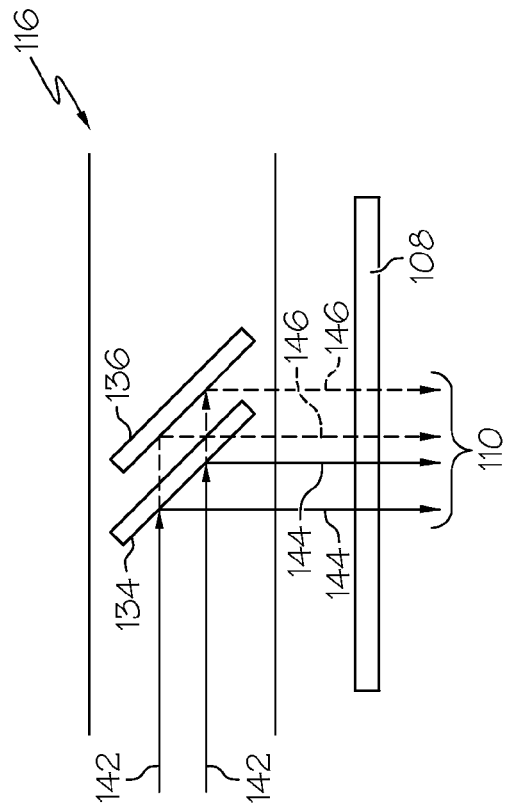

DUAL WAVELENGTH FOCUSABLE AND STEERABLE SEARCHLIGHT

BACKGROUND

The present invention relates to searchlights and more particularly to covert infrared filters for selectively filtering the light source of a searchlight.

Vehicles, such as aircraft and more particularly helicopters, generally have searchlights mounted thereon for providing illumination during take-off, landing, or during search operations. Searchlights may also be useful for identifying aircraft or providing primary or supplemental lighting during operation of the aircraft in adverse conditions, including night operations, rain, and other particle storms. Alternatively, searchlights may be hand held or used in a smaller configuration, such as a flashlight, headlamp, or night vision imaging device.

With the increased use of night vision imaging systems for covert operations, a need has arisen for landing lights, searchlights, and portable light sources that are capable of filtering out visible light and illuminating an area solely with infrared light. While separate infrared and visible spectrum lights may accomplish this objective, there has been recognized a need in the art for a light source which may be converted between infrared and visible illumination.

One method of early convertible night-vision compatible lighting systems utilized a filter over the searchlight cover that allows only infrared light to pass through the filter. This type of filter, however, may be undesirable because of the difficulty in removing or altering the filter, requiring manual access to the searchlight. This limitation restricted the usefulness of the product by limiting flights to either visible-light or infrared-light.

A further improvement was the use of a lamp within a lighting system that has both a visible and an infrared filaments, allowing the operator to switch between the two. Further controls allowed the lamp head to be extended, refracted, and rotated through the use of electrical relays and a selector switch. One example of this improvement is described in U.S. Pat. No. 5,695,272 to Snyder et al.

This improvement allowed significant advantages over the prior art, including the ability to switch between the infrared and visible light spectrum from within the cockpit, thereby eliminating the need to manually remove and replace the searchlight cover to switch modes. However, these lamps do not emit the same intensity as a dedicated infrared or visible light system as the bulb surface is divided between infrared and visible light filtering covers.

U.S. Pat. No. 6,962,423 to Hamilton et al. describes another multi-mode visible and infrared lighthead for use as a landing light or searchlight. This patent describes two separate diodes, one for emitting infrared and the other for emitting visible light, spaced apart in a searchlight with each diode having its own reflector and lens cover. However, this arrangement similarly limits the amount of light that may be transmitted from the searchlight by dedicating a portion of the light-producing elements to only the infrared or visible spectrum.

Another dual mode searchlight is described in U.S. Pat. No. 7,518,133 to Giffen et al. This integrated searchlight lighthead includes separate infrared and visible light illumination sources each positioned within a reflector. The reflectors are merged and separated by an insulating material and air gap, providing cooling of the illumination sources. The merged reflector assembly provides an improved light distribution over previous light sources. However, the merged reflectors are inferior to a single reflector and the combination of separate lighting elements reduces the intensity of the light that may be produced.

Therefore, there has been recognized a need in the art for an improved searchlight capable of selectively transmitting infrared or visible light. There is further a need in the art for an improved searchlight which can be easily switched between infrared and visible illumination without the need for modification of the searchlight housing or cover. Finally, there is a need in the art for an improved searchlight which improves light distribution and efficiency.

SUMMARY

One embodiment of the apparatus is a searchlight for illuminating a distant site. The searchlight may include a light source emitting electromagnetic radiation, a mirror assembly, and a window through which light is projected. The mirror assembly includes a first mirror that splits light from the light source into a first beam that is reflected by the mirror and a second beam that passes through the mirror. A second mirror reflects the second beam. The mirror assembly is adjustable to project one of the first or second beams through the output window.

According to a further embodiment, the first and second mirrors are perpendicular to one another and angled at 45° relative to the light source so that the output beams are projected in opposite directions. The searchlight may also include a motor for rotating the mirror about an axis to selectively project the first or second beam through the window.

According to a further embodiment, the dichroic mirror is a cold mirror that reflects visible light and allows infrared light to pass through where it is reflected by the second mirror.

Alternatively, the first and second mirrors may be parallel to one another such that in a first arrangement both visible and infrared light are reflected through the window, but in a second arrangement only infrared light is reflected through the window.

Also described is a novel mirror assembly for a searchlight that includes a light input and an output window. The mirror assembly includes a first mirror that reflects a portion of the input light and a second mirror that reflects at least a portion of the remaining light. The mirror assembly is adjustable so as to project either the first or second portion of the light through the window.

According to a further embodiment, the searchlight may include a heat sink so that when one light source is projected through the window the other is projected into the heat sink.

According to a further embodiment, the first and second mirrors may be either parallel or perpendicular to one another.

Also described is a novel method for projecting light to a target location. A searchlight with a light source, mirror assembly, and output window is provided. A source beam of light is projected from the light source to the mirror assembly. The beam is split into a first beam and a second beam by means of a dichroic mirror and the first beam is reflected from the dichroic mirror to the target location through the output window.

According to a further embodiment, motors for rotating the mirror about a yaw and pitch axis are provided to direct the light reflected from the dichroic mirror to the target location. The motor for rotating the mirror assembly about the pitch axis may also be utilized to switch between the first beam and second beam, for example between a visible and infrared light.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

FIG. 5A shows a detail view of the mirror assembly according to an alternative embodiment in a first arrangement.
FIG. 5B shows a detail view of the mirror assembly according to an alternative embodiment in a second arrangement.

DETAILED DESCRIPTION

Figure 1A:
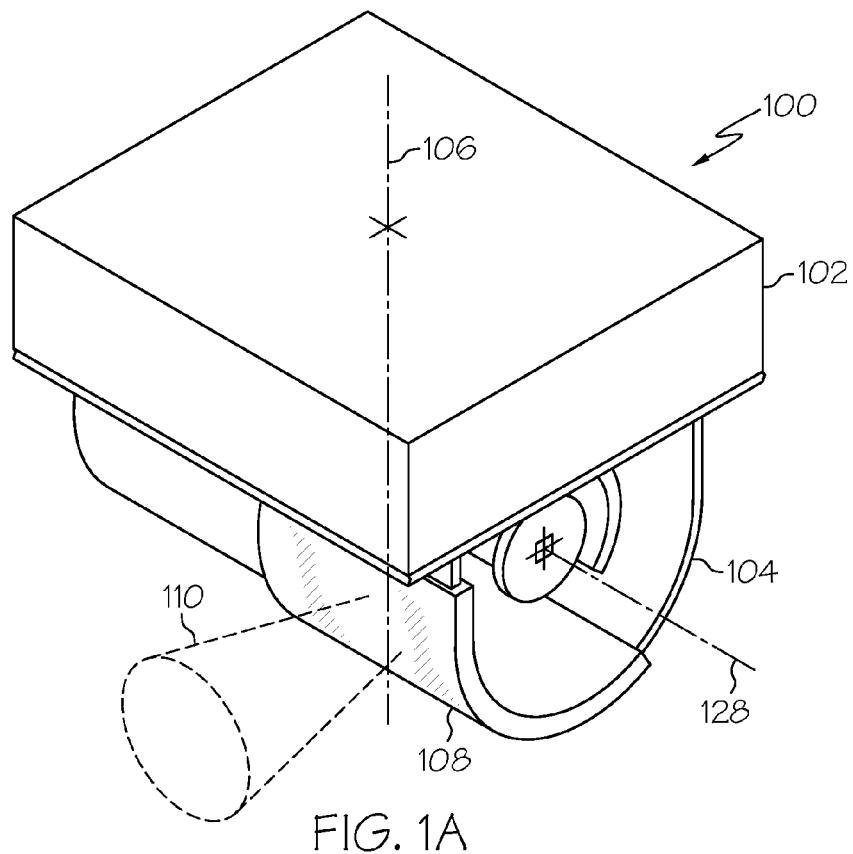
FIG. 1A shows a perspective view of a searchlight.

FIG. 1 shows a perspective view of a searchlight 100 according to one embodiment. The searchlight 100 may include a base section 102 and a projection section 104. The base section 102 and projection section 104 may both be rotated about a yaw axis 106 that may be substantially centered on the searchlight 100. The projection section 104 may include a window 108 through which an output beam 110 may be projected, as will be explained in further detail below.

Figure 2:
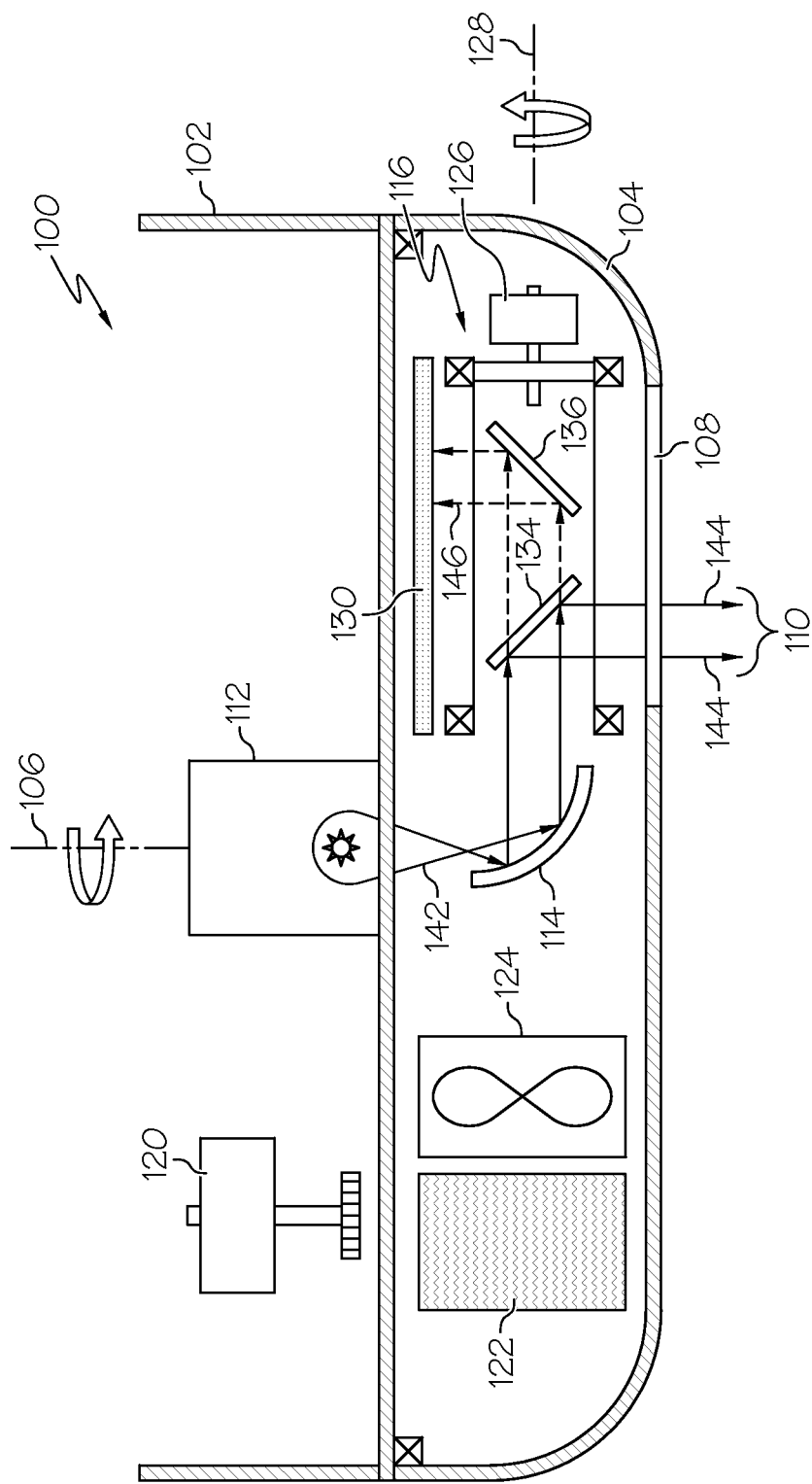
FIG. 2 shows a side cutaway view of the searchlight of FIG. 1.

FIG. 2 shows a cutaway front view of the searchlight 100 demonstrating the various components of the searchlight 100. As shown in this figure, light may be generated by a light source 112 and directed onto a parabolic mirror 114 that reflects light from the light source 112 emitting electromagnetic radiation into the mirror assembly 116. Mirror 114 can also be embodied as a lens and a turning mirror According to the embodiment illustrated, the mirror assembly 116 includes at least one mirror that reflects light through the window 108 to illuminate the desired area.

Also shown in FIG. 2 is a yaw motor 120 for rotating the projection section 104 about the yaw axis 106, a filter 122 and fan 124 which filter and provide ambient air for cooling the various optical components, a mirror motor 126 for pivoting the mirror assembly 116 about a pitch axis 128 and a heat absorber 130. The heat absorber 130 absorbs reflected light, converts it into heat, and dissipates the heat energy into either the ambient air or the filtered airstream provided by the fan 124.

Figure 3:
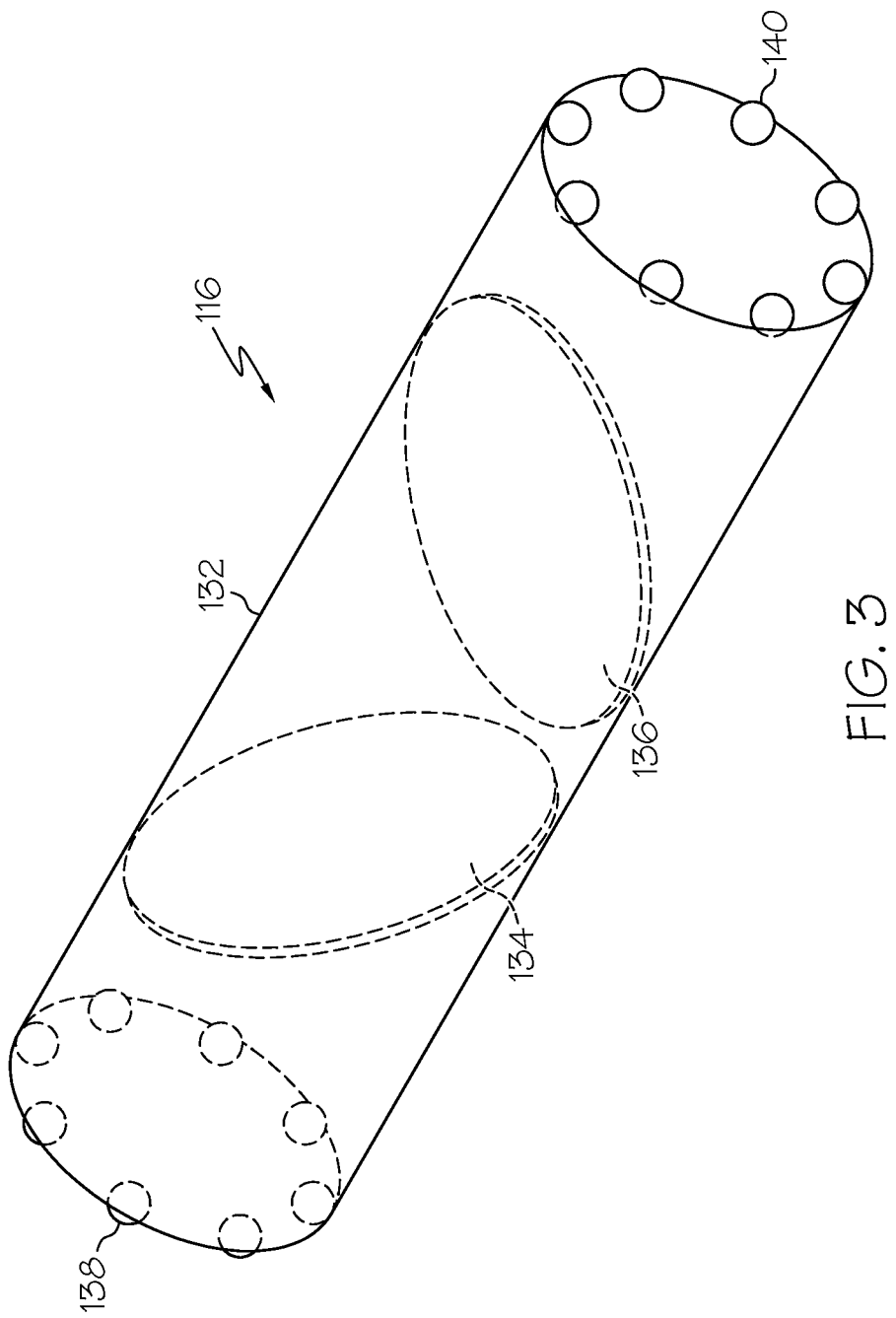
FIG. 3 shows a perspective view of a mirror assembly.

The mirror assembly 116 shown in a front view in FIG. 2 and in perspective in FIG. 3 may include a substantially cylindrical frame 132, visible light mirror 134 and infrared mirror 136. On opposite ends of the frame 132 are a bearing assembly 138 and a mount 140 for receiving the mirror motor 116. The visible light mirror 134 is preferably a dichroic mirror. The mirrors 134, 136 are shown at approximately 45° relative to the pitch axis 128 and at right angles to one another. The 45° orientation is preferred to maximize the effectiveness of the dichroic mirrors and reflect incident light at a right angle. The mirrors 134, 136 are also arranged perpendicular to one another so that light is reflected from the first mirror 134 in the opposite direction of light reflected from the second mirror 136. While this arrangement of the mirrors 134, 136 prevents mixing of the reflected light, it is only one orientation and other arrangements are anticipated. For example, the angle may be selected so that both beams are not allowed to exit the window at the same time.

One example of a dichroic mirror is a PYREX® substrate having a borosilicate crown glass coating. Mirrors that separate infrared from visible light are known in the art as hot (reflecting infrared and passing visible light) or cold (reflecting visible and passing infrared light) mirrors. Hot or cold dichroic mirrors are optimized for a certain angle of incidence, such as 45 degrees, at which a majority (>90%) of the infrared or visible light is reflected while a majority of the other (>80%) light is passed through the mirror. In addition to reflecting infrared or visible light, the dichroic mirrors may also be selected to provide for other wavelengths of light to pass or be reflected. For example, low-pass dichroic mirrors allow short wavelength light to pass through while high-pass dichroic mirrors allow long wavelength light to pass through. Band pass mirrors may also be used to reflect certain wavelengths while passing other wavelengths which may be longer or shorter than those reflected. The specific wavelengths selected to be reflected or passed can be controlled through careful selection of mirrors and coatings.

Figure 4B:
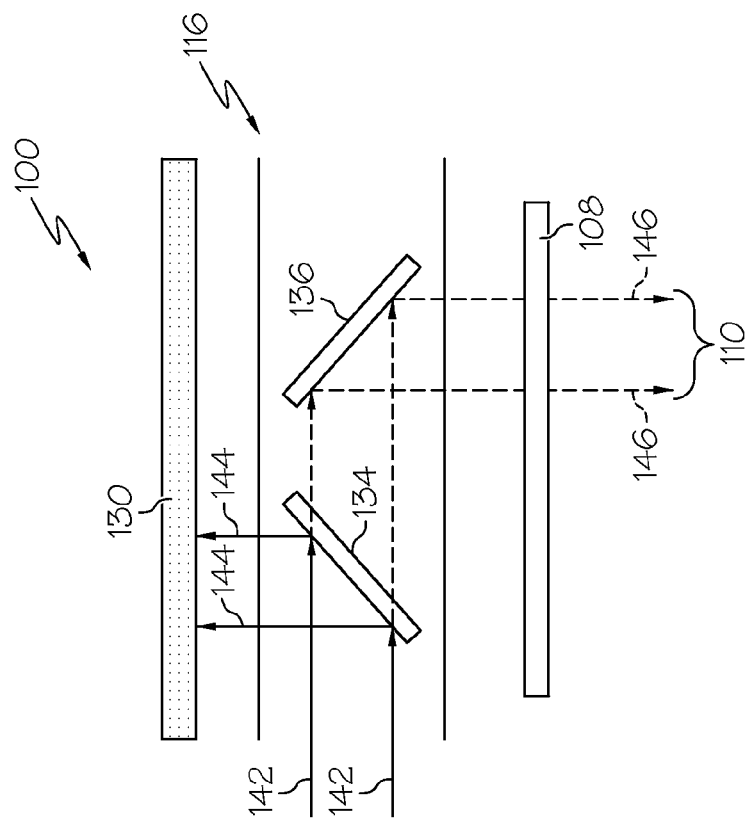
FIG. 4B shows a detail view of the mirror assembly in a second arrangement.
Figure 4A:
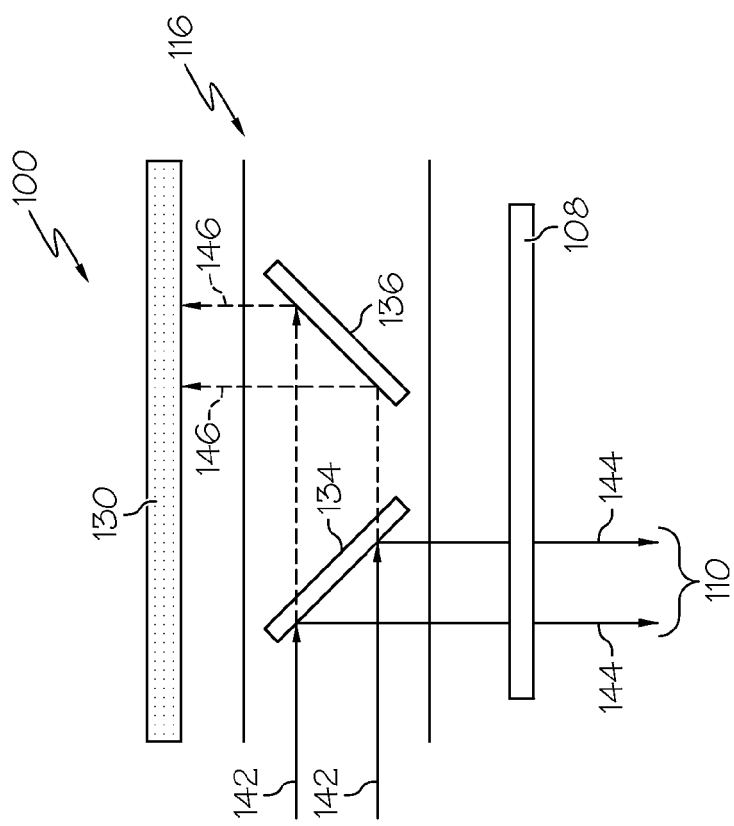
FIG. 4A shows a detail view of the mirror assembly in a first arrangement.

FIGS. 4A and B show an enlarged view of the mirror assembly 116, heat absorber 130, and window 108 in order to illustrate the selective filtering process. As shown in FIG. 4A the visible light mirror 134 may be a cold mirror that allows infrared light 146 to pass through while reflecting visible light 144. Infrared mirror 136 may be either a hot mirror or a regular mirror that reflects all light. As further shown in this figure, when the mirror assembly 116 is in a first orientation, white light 142 that impacts the visible light mirror 134 is split into visible light 144 that is reflected away form the mirror 134 and infrared light 146 that passes through the mirror. In the first orientation, the visible light 146 is reflected out through the window 108. The output beam 110 (FIG. 1) is therefore of visible light. Infrared light 146 that passes through the visible light mirror 134 impacts the infrared mirror 136 and is reflected into the heat absorber 130. Each of the visible 134 and infrared 136 mirrors is at approximately 45° (plus or minus 2°) to reflect visible light 144 perpendicular to the incoming white light 142 and maximize the dichroic features of the mirrors.

A second orientation of the mirror assembly 116 is shown in FIG. 4B. In this orientation, white light 142 that impacts the visible light mirror 134 may also be split into visible light 144 and infrared light 146. However, the mirror assembly 116 has been adjusted so that visible light 144 is reflected from the visible light mirror 134 into the heat absorber 130 while infrared light 146 is reflected from the infrared mirror 136 through the window 108. This provides an output beam 110 (FIG. 1) of infrared light.

As shown in FIGS. 5A-B, an alternative arrangement of mirrors is presented that minimizes the size of the mirror assembly 116 while still allowing for selective control of light that may be projected through the window 108.

A first arrangement for reflecting visible light 146 through the window 108 is shown in FIG. 5A. In this figure, the visible light mirror 134 may be arranged so that white light 142 is reflected from the parabolic mirror 114 through the window 108. As with the embodiment illustrated in FIGS. 4A-B, the visible light mirror 134 may be a cold mirror that allows infrared light 146 to pass through. The infrared mirror 136 may be positioned to be substantially parallel to the visible light mirror 134 so that infrared light 146 that passes through the visible light mirror 134 may be reflected at the same angle as the visible light 144. However, unlike the embodiment described above, in this case the infrared light 146 would also pass through the window 108, and therefore the output beam 110 may include both visible 144 and infrared 146 light.

A second arrangement of this alternative embodiment is illustrated in FIG. 5B. In this arrangement, the infrared mirror 136 remains stationary while the visible light mirror 134 may be pivoted to reflect visible light 144 away from the window 108. The visible light 144 may be reflected by the visible light mirror 134 to a heat sink (not shown) that collects this light and dissipates it as heat. As previously discussed, because the visible light mirror 134 may be a cold mirror, infrared light is passed through the mirror 134 to the infrared mirror 136. Because the position of the infrared mirror 136 has not changed, any infrared light 146 that impacts the infrared mirror 136 will be reflected through the window 108 to form an output beam 110 composed solely of infrared light.

According to this alternative arrangement, the infrared mirror 136 may simply be a standard mirror that reflects all light or it may be a hot mirror that only reflects infrared light and allows other wavelengths of light to pass through. A hot mirror may be preferred if, for example, there is risk of other light contamination while a regular mirror may be preferred to reduce expense.

The above embodiments are described as utilizing a cold mirror that allows infrared light to pass through while reflecting visible light. However, it is appreciated that other types of dichroic mirrors may be utilized to create a searchlight that may be switchable between other various types of light, including ultraviolet or various colors of light.

Figure 6A:
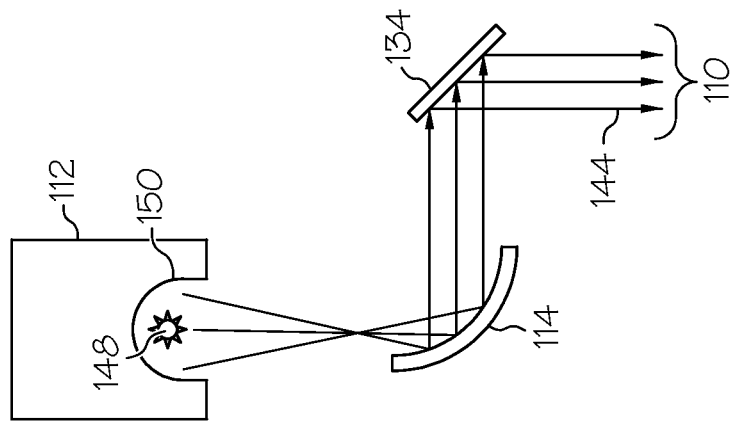
FIG. 6A shows a detail view of a light source according to a first arrangement.
Figure 6B:
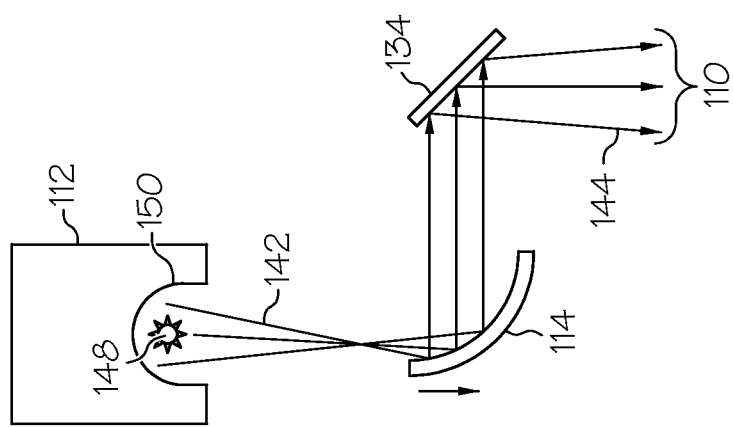
FIG. 6B shows a detail view of the light source according to a second arrangement.
Figure 6C:
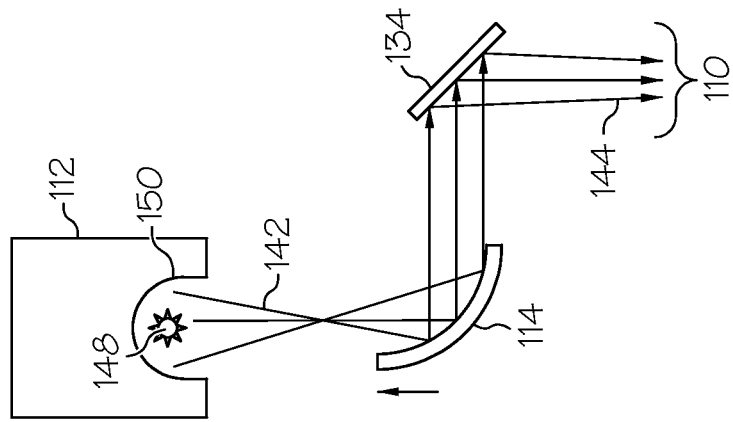
FIG. 6C shows a detail view of the light source according to a third arrangement.

According to a further embodiment illustrated in FIGS. 6A-C, the output beam 110 may narrowed or widened. This is accomplished by adjusting the optics within the searchlight 100 to cause light rays 142 to converge or diverge.

FIGS. 6A-C illustrate the relationship between the light source 112 parabolic mirror 114 and mirror assembly 116. The light source 112 may include a lamp 148, typically approximated as a point source, and an elliptical reflector 150 that reflects light from the lamp 148 in a converging beam to a distant focal point where the light diverges as if from a second point source. The parabolic reflector 114 may be positioned to capture light from this distant focal point and reflect it towards the mirror assembly 116. Similarly, a lens and a turning mirror at 45 degrees can perform the same operation as the off-axis parabola 114. As shown in FIGS. 6B-C, the parabolic mirror 114 may be adjusted away (FIG. 6B) or towards (FIG. 6C) the light source 112. Movement of the parabolic mirror may be according to a variety means, including a movable cylinder, screw, or other apparatus for predictably adjusting the height of the mirror 114 remotely.

As shown in FIG. 6A, when the parabolic mirror 114 is in a neutral position, light rays 142 reflected from the parabolic mirror 114 are substantially parallel and therefore create an output beam of constant diameter.

As shown in FIG. 6B, when the parabolic mirror 114 is in a lower position (further away from the light source 112), light rays 142 reflected from the parabolic mirror 114 will diverge. This diverging light profile may be useful for illuminating a wider area with the searchlight.

Finally, as shown in FIG. 6C, when the parabolic mirror 114 is in an upper position (closer to the light source 112), light rays 142 reflected from the parabolic mirror 114 will converge. This converging profile may be useful for targeting a small area with the searchlight.

Also described in this application is a novel method for adjusting the location, focus, and content of an output beam 110 from a searchlight 100.

Figure 1B:
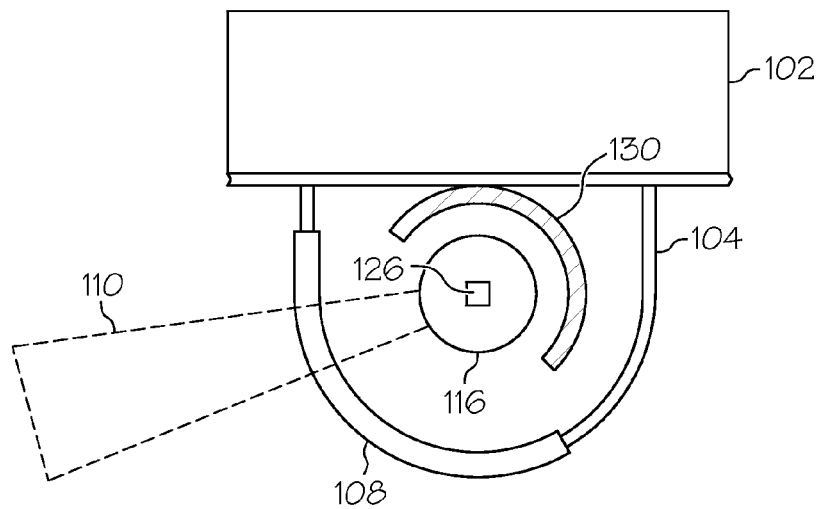
FIG. 1B shows a side plan view of the searchlight.

Fine control of the angular position of the output beam 110 is controlled by means of the yaw motor 120 and mirror motor 126 (FIG. 2). The mirror motor 126 preferably is capable of rotating 360° to fully pivot the mirror assembly 116 about the pitch axis 128. As shown in FIG. 1B, the window 108 extends approximately 110° around a perimeter of the mirror assembly 116. The heat absorber 130 extends for at least an equal angle opposite the window 108 although may extend to complete the perimeter about the window 108. Light reflected from the either the visible light 134 or infrared 136 mirror (FIG. 3) in the mirror assembly 116 is shown as the output beam 110. Therefore, by adjusting the rotational position of the mirror assembly 116 by means of the mirror motor 126, the projected position of the output beam 110 is adjusted.

Conversion between an infrared or visible light output beam 110 is accomplished by adjusting the mirror assembly 116 by a sufficient rotation to expose one of the mirrors 134, 136 (FIG. 3) to the window 108 and the other to the heat sink 130.

Further controlling the position of the output beam 110 is the yaw motor 120 that may rotate the searchlight 100 about the yaw axis 106. The yaw motor may connect the searchlight 100 to another structure, such as a helicopter or other aircraft, and be selectively engaged to rotate the searchlight 100. By adjusting the searchlight about the yaw axis 106, another rotational dimension is added to the output beam 110. By controlling the position of the output beam about the yaw axis 106 and pitch axis 128, the position of the output beam 110 may be directed to any position.

What is claimed is:

1. An illumination device comprising:
    a light source emitting an electromagnetic radiation input beam;
    a dichroic first mirror positioned to receive said electromagnetic radiation, reflect a first output beam having a first radiation profile and transmit a second beam having a second radiation profile, said first and second radiation profiles being one of infrared and visible light;
    a second mirror positioned to receive said second beam from said dichroic first mirror and reflect a second output beam;
    an absorber for absorbing electromagnetic radiation emitted by said light source; and
    an adjustable support for said dichroic first mirror and said second mirror, said adjustable support being adjustable to a first position wherein said first output beam is reflected from said illumination device, and to a second position wherein said first output beam is directed at said absorber and said second beam is reflected from said second mirror.

2. The illumination device of claim 1 wherein said first and second mirrors are perpendicular to one another and angled at substantially 45° to said input beam forming a mirror assembly.

3. The illumination device of claim 2 wherein said first and second output beams are projected in opposite directions.

4. The illumination device of claim 3 wherein said mirror assembly includes a motor for rotating said mirror assembly about a pitch axis.

5. The illumination device of claim 1 wherein said first and second mirrors are parallel to one another in a first arrangement.

6. The illumination device of claim 5 wherein said first and second mirrors are at a substantially 45° angle to said input beam to project said first output beam through a window.

7. The illumination device of claim 6 wherein in said first position said first mirror is perpendicular to said input beam and said second mirror is at a substantially 45° angle to said input beam to project said second output beam through said window.

8. The illumination device of claim 7 wherein said dichroic first mirror is a cold mirror.

9. The illumination device of claim 8 wherein said electromagnetic radiation input beam consists of visible and infrared light and said second radiation profile consists of infrared light.

10. A mirror assembly for an illumination device of a type having a lamp emitting electromagnetic radiation, the mirror assembly comprising:
    a first mirror that reflects a first portion of said electromagnetic radiation in a first beam and passes a second portion of said electromagnetic radiation through said first mirror in a second beam, said first portion of said electromagnetic radiation being visible light and said second portion of said electromagnetic radiation being infrared light;
    a second mirror positioned to receive and reflect said second beam, wherein said first beam is reflected from said first mirror and said second beam is reflected from said second mirror, said first and said second beams being offset from each other; and
    an absorber positioned to receive and absorb said second beam when said first and second mirrors are positioned in a first configuration, and to receive and absorb said first beam when said first and second mirrors are positioned in a second configuration.

11. The mirror assembly of claim 10 wherein said absorber includes a heat sink.

12. The mirror assembly of claim 11 wherein said heat sink is positioned such that said first and said second mirrors direct said second beam upon said heat sink when said mirror assembly is adjusted to said first configuration, and said first and said second mirrors direct said first beam upon said heat sink when said mirror assembly is adjusted to said second configuration.

13. The mirror assembly of claim 12 wherein said first mirror is a dichroic mirror.

14. The mirror assembly of claim 13 wherein said first and second mirrors are oriented substantially perpendicular to one another.

15. The mirror assembly of claim 10 wherein said first and second mirrors are substantially parallel to one another.

16. A mirror assembly for an illumination device of a type having a lamp emitting electromagnetic radiation, the mirror assembly comprising:
    a first mirror that reflects a first portion of said electromagnetic radiation in a first beam and passes a second portion of said electromagnetic radiation through said first mirror in a second beam;
    a second mirror positioned to receive and reflect said second beam, wherein said first beam is reflected from said first mirror and said second beam is reflected from said second mirror, said first and said second beams being offset from each other; and
    an absorber positioned to receive and absorb said second beam when said first and second mirrors are positioned in a first configuration, and to receive and absorb said first beam when said first and second mirrors are positioned in a second configuration.

17. The mirror assembly of claim 16 wherein said absorber includes a heat sink.

18. The mirror assembly of claim 17 wherein said heat sink is positioned such that said first and said second mirrors direct said second beam upon said heat sink when said mirror assembly is adjusted to said first configuration, and said first and said second mirrors direct said first beam upon said heat sink when said mirror assembly is adjusted to said second configuration.

19. The mirror assembly of claim 18 wherein said first mirror is a dichroic mirror.

20. The mirror assembly of claim 19 wherein said first and second mirrors are oriented substantially perpendicular to one another.

* * * * *